United States Patent Office 3,562,274
Patented Feb. 9, 1971

1

3,562,274
N-HETEROCYCLIC N,N'-DIGLYCIDYL COMPOUNDS
Juergen Habermeier, Allschwil, and Daniel Porret, Binningen, Switzerland, assignors to Ciba Limited, Basel, Switzerland, a company of Switzerland
No Drawing. Filed July 29, 1969, Ser. No. 845,889
Claims priority, application Switzerland, Aug. 13, 1968, 12,138/68
Int. Cl. C07d 51/20
U.S. Cl. 260—257          4 Claims

ABSTRACT OF THE DISCLOSURE

New 5,5-disubstituted 1,3-diglycidyl-barbituric acids (1,3-diglycidyl-5,5-diethyl barbituric acid and 1,3-diglycidyl-5-ethyl-5-phenyl barbituric acid) are prepared by a reaction known per se of 5,5-disubstituted barbituric acids with epichlorhydrin in the presence of tertiary amines or quaternary ammonium salts and subsequent dehydrohalogenation with alkali. (The easy accessibility is surprising because the 5-unsubstituted barbituric acid can only be converted into a mono-glycidyl derivative even when treated with a large excess of epichlorhydrin.) The new diepoxides are as aa rule liquid viscous and can be cured with the conventional curing agents, such as dicarboxylic acid anhydrides or polyamines to form shaped articles with good mechanical and electrical properties.

The glycidylation of barbituric acid with epichlorhydrin or β-methylepichlorhydrin in the presence of catalysts and subsequent dehydrohalogenation in a manner which is in itself known is difficult to carry out; in it, the barbituric acid only reacts up to a monoglycidyl product which has not been more closely defined.

It has now been found that 5,5-disubstituted barbituric acids can be easily converted into their N,N'-diglycidyl derivatives.

These new diglycidyl compounds are colourless viscous substances. They are produced in yields of up to 100% and with approximately quantitative epoxide contents by glycidylation of the corresponding 5,5-disubstituted barbituric acids according to methods which are in themselves known. The new diglycidyl compounds can in most cases be purified by vacuum distillation. They can be used as very reactive epoxide resins together with polyanhydrides or polyamines as curing agents.

The subject of the present invention is thus new N-heterocyclic N,N'-diglycidyl compounds of formula

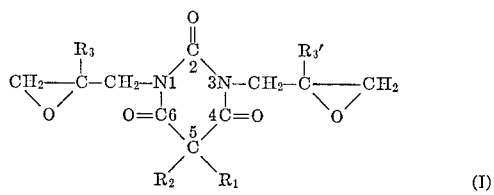

(I)

wherein $R_1$ and $R_2$ independently of each other denote aliphatic, cycloaliphatic, araliphatic or aromatic residues, and in particular preferably alkyl or alkenyl groups having 1 to 5 carbon atoms, cyclohexyl or cyclohexenyl residues or substituted or unsubstituted phenyl residues, and $R_3$ and $R'_3$ each denotes a hydrogen atom or the methyl group.

Preferably, $R_1$ denotes an ethyl residue and $R_2$ an ethyl or phenyl residue in the above formula.

The new diepoxides are manufactured according to methods which are in themselves known. Preferably, the process followed for this is that in a compound of formula

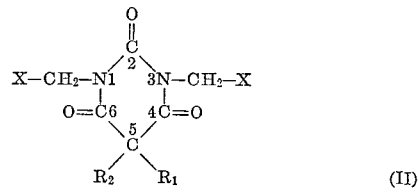

(II)

wherein $R_1$ and $R_2$ have the above-mentioned significance and the residues X are residues which can be converted into 1,2-epoxyethyl or 1-methyl-1,2-epoxyethyl residues, these residues are converted into epoxyethyl residues.

A residue X which can be converted into the 1,2-epoxyethyl residue is above all a hydroxy-halogenethyl residue carrying the functional groups on different carbon atoms, especially a 2-halogen-1-hydroxyethyl residue or a 2-halogen-1-hydroxy-1-methyl-ethyl residue. Halogen atoms are herein especially chlorine or bromine atoms. The reaction takes place in the usual manner, above all in the presence of agents which split off hydrogen halide, such as strong alkalis, for example anhydrous sodium hydroxide or aqueous sodium hydroxide solution. It is at the same time however also possible to use other strongly alkaline reagents such as potassium hydroxide, barium hydroxide, calcium hydroxide, sodium carbonate or potassium carbonate.

A further residue X which can be converted into the 1,2-epoxyethyl residue is for example the vinyl residue which can be converted into the 1,2-epoxyethyl residue in a known manner, such as above all by reaction with hydrogen peroxide or per-acids, for example peracetic, perbenzoic or monoperphthalic acid.

The starting substances of Formula II are obtained in a manner which is in itself known. Thus for example a 5,5-disubstituted barbituric acid of formula

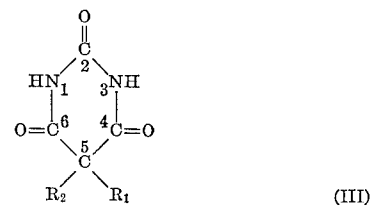

(III)

wherein $R_1$ and $R_2$ have the above-mentioned significance can be reacted with a compound of formula

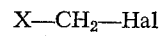

X—CH$_2$—Hal wherein Hal represents a halogen atom and X has the above-mentioned significance. Preferably, the compound of Formula III is reacted with an epihalogenohydrin or β-methylepihalogenohydrin, above all epichlorhydrin or β-methylepichlorhydrin, in the presence of a catalyst, such as especially a tertiary amine, a quaternary ammonium base or a quaternary ammonium salt. Catalysts which are above all suitable for the addition of epichlorhydrin are tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate, methyltriethylammonium chloride; hydrazines having a tertiary nitrogen atom such as 1,1-dimethylhydrazine, which can also be employed in the quaternised form; alkali halides such as lithium chloride, potassium chloride, sodium chloride, bromide or fluoride; and also ion exchanger resins having tertiary or quaternary amino groups, as well as ion exchangers with acid amide groups.

Basic impurities which can occur in technical commercially available forms of the starting compounds (III) can also act as the catalyst. In such cases it is not necessary to add a special catalyst.

The invention also relates to those embodiments of the process in which one starts from a compound obtainable as an intermediate product at any stage and carries out the missing process stages or in which a starting substance is formed under the reaction conditions and further processed under isolation.

A preferred embodiment of the process therefore for example consists of reacting an epihalogenohydrin or β-methylepihalogenohydrin, preferably epichlorhydrin or β-methylepichlorhydrin, in the presence of a catalyst such as preferably a tertiary amine, a quaternary ammonium base or a quaternary ammonium salt, with a compound of Formula III and in a second stage treating the resulting product containing halogenohydrin groups with reagents which split off hydrogen halide. In these reactions the procedure described above is followed, and the above-mentioned compounds can be used as catalysts for the addition of epihalogenohydrin or β-methylepihalogenohydrin or for the dehydrohalogenation. At the same time particularly good yields are obtained if an excess of epichlorhydrin or β-methylepichlorhydrin is used. During the first reaction, before the addition of alkali, a partial epoxidation of the dichlorhydrin or of the dichloro-β-methylhydrin of the 5,5-disubstituted barbituric acid already occurs. The epichlorhydrin or the β-methylepichlorhydrin which acts as a hydrogen chloride acceptor has then been partially converted into glycerine dichlorhydrin or into β-methylglycerine dichlorhydrin.

The manufacture of the N,N'-diglycidyl compounds succeeds particularly easily according to the process described above when starting from 5,5-disubstituted barbituric acids of formula

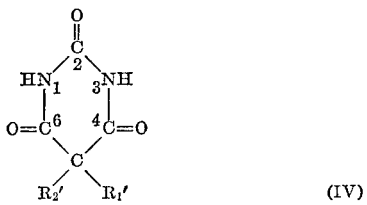

(IV)

wherein $R_1'$ and $R_2'$ independently of each other denote an alkyl or alkenyl residue with 1 to 5 carbon atoms, a cyclohexyl or cyclohexenyl residue or a substituted or unsubstituted phenyl residue.

The following may be mentioned:

5,5-diethylbarbituric acid,
5-ethyl-5-butylbarbituric acid,
5-ethyl-5-sec-butylbarbituric acid,
5-ethyl-5-isopentylbarbituric acid,
5,5-diallylbarbituric acid,
5-allyl-5-isopropylbarbituric acid,
5-allyl-5-sec-butylbarbituric acid,
5-ethyl-5-(1'-methylbutyl)-barbituric acid,
5-allyl-5-(1'-methylbutyl)-barbituric acid,
5-ethyl-5-(1'-methyl-1'-butenyl)-barbituric acid,
5-ethyl-5-phenylbarbituric acid and
5-ethyl-5-(1'-cyclohexen-1-yl)-barbituric acid.

The addition of the epihalogenohydrin or of the β-methylepihalogenohydrin to the 5,5-disubstituted barbituric acids can here take place according to known processes with or without solvents, with a small or greater excess of epichlorhydrin, at temperatures up to 140° C., under the catalytic influence of tertiary amines, quaternary ammonium salts, alkali halides and other anionically active catalysts, in 30 to 360 minutes. The subsequent dehydrohalogenation can take place at 40 to 70° C. with solid or liquid alkalis and optionally with the resulting water being distilled off azeotropically. The alkali halide is separated off according to known processes. The resulting 1,3-diglycidyl-barbituric acid derivatives or 1,3-di-β-methylglycidyl-barbituric acid derivatives are isolated by distilling off the excess of epihalogenohydrin or β-methylepihalogenohydrin and, where relevant, the excess of the solvent. They are as a rule obtained as viscous liquids in yields of up to 100%.

The diepoxides of Formula I according to the invention react with the usual curing agents for epoxide compounds. They can therefore be crosslinked or cured by the addition of such curing agents analogously to other polyfunctional epoxide compounds. Basic or acid compounds are possible curing agents of this kind.

The following may for example be mentioned as suitable curing agents: amines or amides such as aliphatic, cycloaliphatic or aromatic, primary, secondary and tertiary amines, for example monoethanolamine, ethylenediamine, hexamethylenediamine, trimethylhexamethylenediamine, diethylenetriamine triethylenetetramine, tetraethylenepentamine, N,N - dimethylpropylenediamine - 1,3, N,N-diethylpropylenediamine-1,3, 2,2-bis(4'-aminocyclohexyl)propane, 3,5,5 - trimethyl-3-(aminomethyl)-cyclohexylamine ("isophoronediamine"), Mannich bases such as 2,4,6-tris(dimethylaminomethyl)phenol; m-phenylenediamine, p-phenylenediamine, bis(4 - aminophenyl)methane, bis(4 - aminophenyl)sulphone, m - xylylenediamine; adducts of acrylonitrile or monoepoxides such as ethylene oxide or propylene oxide to polyalkylene-polyamines such as diethylenetriamine or triethylenetetramine; adducts of polyamines, such as diethylenetriamine or triethylenetetramine, in excess and polyepoxides such as diomethane-polyglycidyl ethers; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine, and dimerised or trimerised unsaturated fatty acids such as dimerised linseed oil fatty acid (Versamid); polymeric polysulphides (Thiokol); dicyandiamide, aniline-formaldehyde resins; polyhydric phenols, for example resorcinol 2,2-bis(4-hydroxyphenyl)propane or phenolformaldehyde resins; boron trifluoride and its complexes with organic compounds such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadicanhydride), 3,4,5,6,7,7 - hexachlor - 3,6 - endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Furthermore, cure accelerators can be employed in the cure, and in particular when using polyamides, dicyandiamide, polymeric polysulphides or polycarboxylic acid anhydrides as curing agents; such accelerators are for example: tertiary amines, their salts or quaternary ammonium compounds, for example 2,4,6-tris(dimethylaminomethyl)phenyl, benzyldimethylamine, 2 - ethyl - 4 - methyl-imidazole or triamylammonium phenolate; or alkali metal alcoholates such as for example sodium hexanetriolate.

The term "curing agent" as used here denotes the conversion of the above diepoxides into insoluble and infusible cross-linked products, and in fact as a rule with simultaneous shaping to give shaped articles such as castings, pressings or laminates or to give two-dimensional structures such as coatings, lacquer films or adhesive bonds.

If desired, active diluents such as for example styrene oxide, butyl glycidyl ether, iso-octyl glycidyl ether, phenyl glycidyl ether, cresyl glycidyl ether, glycidyl esters of synthetic highly vranched mainly tertiary aliphatic monocarboxylic acids (Cardura E) or cycloaliphatic monoepoxides such as 3-vinyl-2,4-dioxaspiro-(5.5)-9,10-epoxyundecane can be added to the diepoxides according to the invention in order to lower the viscosity.

The diepoxides according to the invention can furthermore be used mixed with other curable diepoxide or polyepoxide compounds. As such, there may for example be mentioned: polyglycidyl ethers of polyhydric alcohols such as 1,4-butanediol, polyethylene glycols, polypropylene glycols or 2,2-bis(4'-hydroxycyclohexyl)propane; polyglycidyl ethers of polyhydric phenols such as 2,2-bis(4'-hydroxyphenyl)propane (=diomethane), 2,2 - bis(4'-hydroxy - 3',5' - dibromophenyl)propane, bis(4 - hydroxyphenyl)sulphone, 1,1,2,2 - tetrakis(4' - hydroxyphenyl) ethane or condensation products, manufactured in an acid medium, of formaldehyde with phenols such as phenolnovolacs or cresol-novolacs; further, di- or poly(β-methylglycidyl) ethers of the above-mentioned polyalcohols and polyphenols; polyglycidyl esters of polycarboxylic acids such as for example phthalic acid diglycidyl ester, tetrahydrophthalic acid diglycidyl ester or hexahydrophthalic acid diglycidyl ester; triglycidyl isocyanurate; N,N'-diglycidyl-5,5-dimethylhydantoin, aminopolyepoxides such as are obtained by dehydrohalogenation of the reaction products of epihalogenohydrin and primary or secondary amines, such as aniline or 4,4'-diaminodiphenylmethane; further, alicyclic compounds containing several epoxide groups, such as vinylcyclohexene diepoxide, dicyclopentadiene diepoxide, ethylene glycol-bis-(3,4-epoxytetrahydrodicyclopentadien - 8 - yl)-ether, bis(3,4-epoxycyclohexylmethyl)adipate, (3',4' - epoxycyclohexylmethyl) - 3,4-epoxycyclohexanecarboxylate, (3',4' - epoxy - 6' - methylcyclohexylmethyl)-3,4-epoxy - 6 - methylcyclohexanecarboxylate, bis(cyclopentyl)ether diepoxide or 3 - (3',4'-epoxycyclohexyl) - 2,4 - dioxaspiro - (5.5) - 9,10 - epoxyundecane.

The subject of the present invention is therefore also curable mixtures which are suitable for the manufacture of shaped articles including two-dimentional structures and which contain the diepoxides according to the invention, optionally together with other diepoxide or polyepoxide compounds and, further, curing agents for epoxide resins such as polyamines or polycarboxylic acid anhydrides.

The diepoxides according to the invention, or their mixtures with other polyepoxide compounds and/or curing agents, can further be mixed, in any stage before cure, with usual modifiers such as extenders, fillers and reinforcing agents, pigments, dyestuffs, plasticisers, flow control agents, agents for conferring thixotropy, flameproofing substances or mould release agents.

The following may for example be mentioned as extenders, reinforcing agents, fillers and pigments which can be employed in the curable mixtures according to the invention: coal tar, bitumen, glass fibres, boron fibres, carbon fibres, cellulose, polyethylene powder, polypropylene powder, mica, asbestos, quartz powder, slate powder, aluminum oxide trihydrate, chalk powder, gypsum, antimony trioxide, bentones, silica aerogel (Aerosil), lithopone, barytes, titanium dioxide, carbon black, graphite, iron oxide or metal powders such as aluminum powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate trixylenyl phosphate and also polypropylene glycols can for example be employed as plasticizers for modifying the curable mixtures.

Especially for use in the lacquer field, the new diepoxides can furthermore be partially or completely esterified in a known manner with carboxylic acids such as especially higher unsaturated fatty acids. It is furthermore possible to add other curable synthetic resins, for example phenoplasts or aminoplasts to such lacquer resin formulations.

The curable mixtures, in the unfilled or filled state, optionally in the form of solutions or emulsions, can serve as laminating resins, paints, lacquers, dipping resins, impregnating resins, casting resins, compression moulding compositions, sintering powders, spreading and filling compositions, floor covering compositions, potting and insulating compositions for the electrical industry, or adhesives, as well as for the manufacture of such products.

In particular, the mixtures of 1,3-diglycidyl-5,5-diethyl- or -5-ethyl-5-phenylbarbituric acid with polyamines or polycarboxylic acid anhydrides represent very reactive resin/curing agent systems.

Cured mouldings made from this resin show good heat stability and good electrical properties combined with good mechanical properties.

In the examples which follow the parts denote parts by weight and the percentages denote percentages by weight.

EXAMPLE 1

A mixture of 92.1 g. of 5,5-diethyl-barbituric acid (0.5 mol), 1390 g. of epichlorohydrin (15 mols) [corresponding to a ratio of NH groups to epichlorohydrin=1:15] and 4.15 g. of tetraethylammonium chloride (5 mol percent) is stirred for 3 hours at 90° C. The reaction mixture is a clear colourless solution from the start. After 3 hours the mixture is cooled to 60° C. and 56.0 g. of 97% strength sodium hydroxide powder (1.35 mols) are added in 10 equal portions over the course of 30 minutes with intensive stirring. After the addition of alkali the mixture is stirred for a further 10 minutes at 60° C. and is then distilled at 60° C. and about 50 mm. Hg with good stirring until all the water produced during the reaction has been azeotropically distilled off.

The resulting sodium chloride is separated from the solution by filtration and is rinsed with a little epichlohydrin. The combined epichlorhydrin solutions are extracted by shaking with 250 ml. of water in order to remove catalyst residues. The aqueous layer is separated off and the epichlorhydrin solution is concentrated at 60° C./15 mm. Hg until no further epichlorhydrin distills off. Thereafter the residue is further treated at 60° C. and 0.1 mm. Hg until the last volatile constituents have been removed.

148.0 g. of 1,3-diglycidyl-5,5-diethylbarbituric acid (100% of theory) are obtained, with an epoxide content of 6.21 epoxide equivalents/kg. (corresponding to 91.6% of theory). The new diglycidyl compound is obtained as an almost colourless viscous liquid.

The new diglycidyl compounds can be purified by vacuum distillation. The boiling point is at 143 to 146° C. under 0.5 mm. Hg, the distillate is completely colourless and the epoxide content is 6.54 equivalents/kg. (97% of theory).

Elementary analysis shows the following values: Found (percent): C, 56.08; H, 6.79; N, 9.39. Calculated (percent): C, 56.74; H, 6.80; N, 9.45.

EXAMPLE 2

116.2 g. of 5-ethyl-5-phenyl-barbituric acid (0.5 mol) are mixed with 1390 g. of epichlorohydrin (15 mols) [corresponding to a ratio of NH groups to epichlorohydrin of 1:15] and with 4.15 g. of tetraethylammonium chloride (5 mol percent) and stirred for 3 hours at 90° C. Thereafter the colourless and clear solution is cooled to 60° C. and mixed over the course of 30 minutes with 56.0 g. of finely powdered sodium hydroxide in small portions, with good stirring. Thereafter the mixture is stirred for a further 15 minutes at 60° C. The further working up then takes place according to Example 1.

157.2 g. of 1,3-diglycidyl-5-ethyl-5-phenyl-barbituric acid (91.3% of theory) are obtained, with an epoxide content of 4.87 equivalents/kg. (corresponding to 84.5% of theory). The new diglycidyl compound is a colourless highly viscous liquid.

EXAMPLE 3

A mixture of 134.0 g. of 5,5-diethylbarbituric acid (0.728 mol), 3100 g. of β-methylepichlorhydrin (29.1 mols) and 6.01 g. of tetraethylammonium chloride (5 mol percent) is stirred for 1.5 hours at 117 to 121° C. under reflux. A clear pale yellow solution is produced. The mixture is cooled to 60° C. and 151.6 g. of 50% strength sodium hydroxide solution (1.89 mols) are added dropwise over the course of 2 hours with good stirring; in the course of this the water present in the reaction mixture is continuously removed by azeotropic circulatory distillation under a slight waterpump vacuum at 60° C., and is separated off. 101 g. of water separate out (theory 102 g.). The resulting sodium chloride is separated from the solution of filtration and is rinsed with a little β-methylepichlorhydrin. The solution is washed with 145 ml. of water to remove catalyst residues and sodium chloride residues. The aqueous layer is separated off and the organic phase is concentrated at 60° C./15 mm. Hg until no further β-methylepichlorohydrin distils off. Thereafter the residue is further treated at 60° C. and 0.1 mm., Hg until the last volatile constituents have been removed.

227.0 g. (959.7% of theory) of a light ochre yellow, viscous resin are obtained, containing 5.43 epoxide equivalents/kg. (88% of theory); the total chlorine content is 1.2%.

This new di-(β-methylglycidyl) compound can be purified by vacuum distillation. Under 0.3 mm. Hg. 68.3% of the crude product introduced distil at 155 to 157° C. The resin purified in this way is a colourless viscous oils and its epoxide content is 5.78 equivalents/kg. (93.5% of theory).

Elementary analysis shows the following values: Found (percent): C, 59.50; H, 7.53; N, 8.38; 0.7 total chlorine. Calculated (percent): C, 59.24; H, 7.46; N, 8.64; 0 total chlorine.

The infrared spectrum shows, through the absence of N—H frequencies and the presence of epoxide frequencies, that the β-methylglycidylation has taken place as desired. The nuclear magnetic resonance spectrum in $CDCl_3$ (60 Mc H—NMR) proves, by means of the signals at

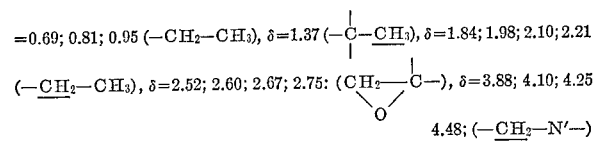

and through the agreement of the integrations with the proton number that the following structure is concerned:

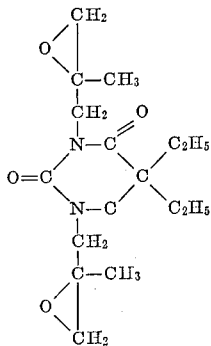

Use examples (A) A homogeneous mixture of 55 g. of a crude product of 1,3-diglycidyl-5,5-diethylbarbituric acid, manufactured according to Example 1, containing 5.5 epoxide equivalents/kg., and 55 g. of a liquid anhydride mixture consisting of 9 parts of phthalic anhydride, 13 parts of $\Delta^4$-tetrahydrophthalic anhydride, 78 parts of hexahydrophthalic anhydride and 15 parts of cresylglycide, is cured in an aluminum mould, in 4 hours at 120° C. and 15 hours at 150° C., to give a colourless glass-clear moulding with the following properties:

flexural strength (VSM 77103) = 6.0 kp./mm.$^2$
deflection: (VSM 77103) = 4.2 mm.
heat distortion point according to Martens (DIN 53,458) = 71° C.
cold water absorption (4 days/20° C.) = 0.53%

(B) A homogeneous mixture of 60 g. of a crude 1,3-diglycidyl-5,5-diethylbarbituric acid manufactured according to Example 1 and of 42 g. of $\Delta^4$-tetrahydrophthalic anhydride is cured in an aluminum mould, in 4 hours at 120° C. and 15 hours at 150° C., to give a glass-clear casting having the following properties:

heat distortion point according to Martens (DIN 53,458) = 76° C.
flexural strength (VSM 77,103) = 6.6 kp./mm.$^2$
deflection (VSM 77,103) = 4.7 mm.
impact strength (VSM 77,103) = 6.7 cm. kg./cm.$^2$

We claim:
1. An N-heterocyclic N,N' - diglycidyl compound of formula

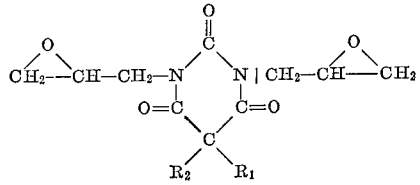

wherein $R_1$ and $R_2$ each represents a member selected from the group consisting of alkyl with 1 to 5 carbon atoms, alkenyl with 1 to 5 carbon atoms, cyclohexyl, cyclohexenyl and phenyl.

2. 1,3-diglycidyl-5,5-diethyl-barbituric acid.
3. 1,3-diglycidyl-5-ethyl-5-phenyl-barbituric acid.
4. 1,3-di-(β-methylglycidyl) - 5,5 - diethyl-barbituric acid.

References Cited

UNITED STATES PATENTS 3,464,990  9/1969  Brossi et al. _____ 260—257

ALEX MAZEL, Primary Examiner

A. M. TIGHE, Assistant Examiner

U.S. Cl. X.R.

260—2, 37, 57, 69, 72, 78